(12) United States Patent
Lee et al.

(10) Patent No.: US 12,094,129 B2
(45) Date of Patent: Sep. 17, 2024

(54) ELECTRONIC APPARATUS AND CONTROLLING METHOD THEREOF

(71) Applicant: Samsung Electronics Co., Ltd., Suwon-si (KR)

(72) Inventors: Jaeha Lee, Suwon-si (KR); Taehyeong Kim, Suwon-si (KR); Hyunjung Nam, Suwon-si (KR); Jaebum Park, Suwon-si (KR); Joonah Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 626 days.

(21) Appl. No.: 17/144,488

(22) Filed: Jan. 8, 2021

(65) Prior Publication Data
US 2021/0241467 A1 Aug. 5, 2021

(30) Foreign Application Priority Data
Feb. 5, 2020 (KR) .................. 10-2020-0013563

(51) Int. Cl.
| G06K 9/00 | (2022.01) |
| G01S 17/08 | (2006.01) |
| G01S 17/89 | (2020.01) |
| G06T 7/246 | (2017.01) |
| G06V 10/80 | (2022.01) |
| G06V 20/10 | (2022.01) |

(Continued)

(52) U.S. Cl.
CPC .............. *G06T 7/248* (2017.01); *G01S 17/08* (2013.01); *G01S 17/89* (2013.01); *G06V 10/811* (2022.01); *G06V 20/10* (2022.01); *G06V 40/103* (2022.01); *H04N 23/695* (2023.01)

(58) Field of Classification Search
None
See application file for complete search history.

(56) References Cited

U.S. PATENT DOCUMENTS

| 9,639,748 B2 | 5/2017 | Porikli et al. |
| 10,754,025 B2 | 8/2020 | Asghar et al. |
| 2004/0178945 A1 | 9/2004 | Buchanan |

(Continued)

FOREIGN PATENT DOCUMENTS

| EP | 1 302 365 B1 | 2/2007 |
| JP | 2018-205870 A | 12/2018 |

(Continued)

OTHER PUBLICATIONS

Search Report and Written Opinion dated Apr. 29, 2021, issued in International Application No. PCT/KR2021/000710.

*Primary Examiner* — Wei Wen Yang
(74) *Attorney, Agent, or Firm* — Jefferson IP Law, LLP

(57) ABSTRACT

An electronic apparatus is provided. The electronic apparatus includes a camera, a Light Detection And Ranging (LiDAR) sensor, and a processor configured to track an object based on a plurality of images photographed by the camera sequentially, wherein, to track the object based on the plurality of images, the processor is configured to, based on the object being identified in a first image from among a plurality of images and subsequently, not being identified in a second image after the first image, control a photographing direction of the camera based on scanning information obtained by the LiDAR sensor.

17 Claims, 12 Drawing Sheets

(51) Int. Cl.
  *G06V 40/10*       (2022.01)
  *H04N 23/695*      (2023.01)

(56)            References Cited

U.S. PATENT DOCUMENTS

| | | | |
|---|---|---|---|
| 2011/0026770 | A1 | 2/2011 | Brookshire |
| 2012/0330528 | A1 | 12/2012 | Schwindt et al. |
| 2015/0199577 | A1 | 7/2015 | Kim |
| 2018/0293445 | A1 | 10/2018 | Gao et al. |
| 2019/0052844 | A1 * | 2/2019 | Droz ................... H04N 23/60 |
| 2019/0391254 | A1 | 12/2019 | Asghar et al. |
| 2021/0018612 | A1 | 1/2021 | Asghar et al. |

FOREIGN PATENT DOCUMENTS

| | | |
|---|---|---|
| JP | 2019/219373 A | 12/2019 |
| KR | 10-1486308 B1 | 2/2015 |
| KR | 10-2016-0077684 A | 7/2016 |
| KR | 10-1752586 B1 | 6/2017 |
| KR | 10-1788973 B1 | 11/2017 |
| KR | 10-2018-0047339 A | 5/2018 |
| KR | 10-2019-0074769 A | 6/2019 |

* cited by examiner

ELECTRONIC APPARATUS AND CONTROLLING METHOD THEREOF

CROSS-REFERENCE TO RELATED APPLICATION(S)

This application is based on and claims priority under 35 U.S.C. § 119(a) of a Korean patent application number 10-2020-0013563, filed on Feb. 5, 2020, in the Korean Intellectual Property Office, the disclosure of which is incorporated by reference herein in its entirety.

BACKGROUND

1. Field

The disclosure relates to an electronic apparatus and a method of controlling thereof. More particularly, the disclosure relates to an electronic apparatus that tracks an identified object and a method of controlling thereof.

2. Description of Related Art

Recently, as the need for technology development such as autonomous driving increases, various devices for identifying and tracking surrounding objects have been developed.

However, when only one camera is used, a blur phenomenon may occur in response to fast movement, making it difficult to perform tracking, and when the Frame Per Second (FPS) is low, tracking performance may be deteriorated.

In addition, if an object is out of the field of view of the camera, tracking cannot be performed any longer. To solve this problem, a plurality of cameras may be used, but in this case, the manufacturing cost increases.

Alternatively, a multi-channel 360° Light Detection And Ranging (LiDAR) may be used, but even in this case, cost increases and recognition performance is lower than that of a camera. In particular, it is difficult to specify a user.

Accordingly, there is a need to develop a method for improving the performance of tracking an object even in a low-cost On-Device environment.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus capable of tracking an object even if the object is not identified by a camera and a method of controlling thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a camera, a Light Detection And Ranging (LiDAR) sensor and a processor configured to track an object based on a plurality of images photographed by the camera sequentially, and, to track the object based on the plurality of images, the processor is configured to, based on the object being identified in a first image from among a plurality of images and subsequently, not being identified in a second image after the first image, control a photographing direction of the camera based on scanning information obtained by the LiDAR sensor.

The apparatus may further include a driving unit configured to control a photographing direction of the camera, and the processor may further be configured to control the driving unit to change a photographing direction of the camera based on the scanning information.

The apparatus may further include a memory, and the processor may further be configured to identify an object based on first scanning information obtained by the LiDAR sensor while the first image is obtained, match an object obtained from the first image and an object obtained from the first scanning information, and store location information of the matched object in the memory.

The processor may further be configured to identify at least one object based on second scanning information obtained by the LiDAR sensor while the second image is obtained, identify an object corresponding to location information of an object stored in the memory from among the at least one object, and control the driving unit to change a photographing direction of the camera based on the object corresponding to the location information of the object stored in the memory.

The processor may further be configured to, based on a plurality of objects being identified based on the second scanning information, identify an object most adjacent to the object stored in the memory from among the plurality of objects based on the location information of the object stored in the memory, and control the driving unit to change a photographing direction of the camera based on the most adjacent object.

The processor may further be configured to, based on the object being identified in a third image obtained by the camera after the photographing direction of the camera is changed, terminate control of the driving unit.

The processor may further be configured to obtain location information of the matched object based on the object obtained from the first scanning information.

The processor may further be configured to, based on the object not being identified in the second image, obtain the scanning information by turning on the LiDAR sensor, and based on a plurality of objects being identified from the scanning information, identify one of the plurality of objects based on a photographing direction of the camera.

A case where the object is not identified in the second image may include a case where the object is not identified in an image photographed by the camera based on at least one of a motion of the object, a motion of the electronic apparatus or a quality of the image photographed by the camera.

The scanning information obtained by the LiDAR sensor may be information obtained by scanning a direction of 180° or 300° with reference to the electronic apparatus.

In accordance with another aspect of the disclosure, a method of controlling an electronic apparatus is provided. The method includes tracking an object based on a plurality of images photographed by a camera of the electronic apparatus sequentially, and based on the object being identified in a first image from among a plurality of images and, subsequently, not being identified in a second image after the first image, controlling a photographing direction of the camera based on scanning information obtained by a LiDAR sensor of the electronic apparatus.

The method may further include changing a photographing direction of the camera based on the scanning information.

The method may further include identifying an object based on first scanning information obtained by the LiDAR sensor while the first image is obtained, matching an object obtained from the first image and an object obtained from the first scanning information, and storing location information of the matched object in a memory of the electronic apparatus.

The controlling of the photographing direction of the camera includes identifying at least one object based on second scanning information obtained by the LiDAR sensor while the second image is obtained, identifying an object corresponding to location information of an object stored in the memory from among the at least one object, and changing a photographing direction of the camera based on the object corresponding to the location information of the object stored in the memory.

The identifying of the object corresponding to location information of an object stored in the memory may include, based on a plurality of objects being identified based on the second scanning information, identifying an object most adjacent to the object stored in the memory from among the plurality of objects based on the location information of the object stored in the memory, and the changing a photographing direction of the camera may include changing a photographing direction of the camera based on the most adjacent object.

The method may further include, based on the object being identified in a third image obtained by the camera after the photographing direction of the camera is changed, terminating control of the photographing direction of the camera.

The method may further include obtaining location information of the matched object based on the object obtained from the first scanning information.

The controlling of the photographing direction of the camera may include, based on the object not being identified in the second image, obtaining the scanning information by turning on the LiDAR sensor, and based on a plurality of objects being identified from the scanning information, identifying one of the plurality of objects based on a photographing direction of the camera.

A case where the object is not identified in the second image may include a case where the object is not identified in an image photographed by the camera based on at least one of a motion of the object, a motion of the electronic apparatus or a quality of the image photographed by the camera.

The scanning information obtained by the LiDAR sensor may be information obtained by scanning a direction of 180° or 300° with reference to the electronic apparatus.

According to the above-described various embodiments, even if an object is not identified by the camera, the electronic apparatus may track the object through a LiDAR sensor continuously.

In addition, even though the location of the object is changed, the electronic apparatus may obtain again the image of the object by changing a photographing direction of the camera based on the location information of the object by the LiDAR sensor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
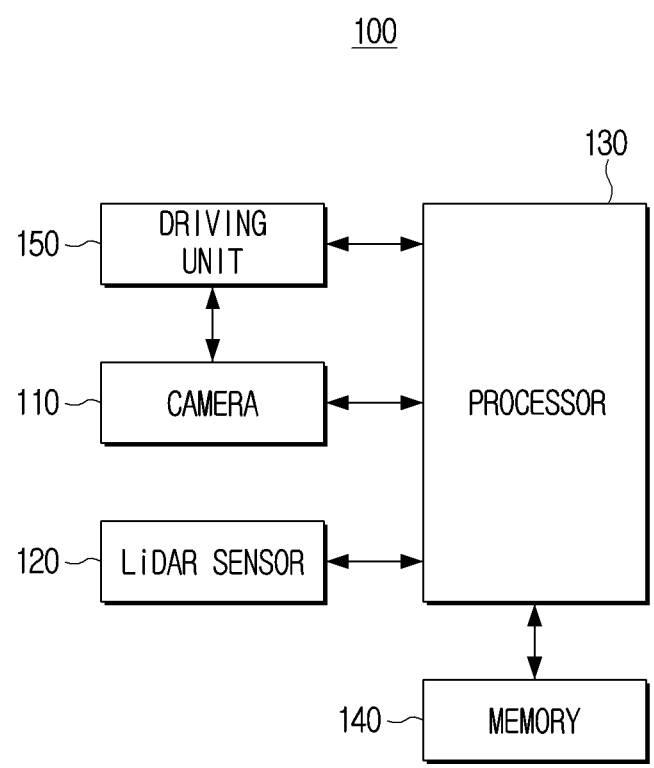
FIG. 1 is a block diagram illustrating configuration of an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the disclosure will be described in detail with reference to the accompanying drawings.

General terms that are currently widely used are selected as terms used in embodiments of the disclosure in consideration of functions in the disclosure, but may be changed depending on the intention of those skilled in the art or a judicial precedent, the emergence of a new technique and the like. In addition, in a specific case, terms arbitrarily chosen by an applicant may exist. In this case, the meanings of such terms are mentioned in detail in corresponding description portions of the disclosure. Therefore, the terms used in the embodiments of the disclosure need to be defined based on the meanings of the terms and the contents throughout the disclosure rather than simple names of the terms.

In the disclosure, the terms "have", "may have", "comprise", or "may comprise" designate the presence of the corresponding features (e.g., numbers, functions, operations or components such as parts, etc.), but do not exclude the presence of additional features.

Expressions such as "A or/and B" should be understood to mean one of "A", "B" or "A and B."

Expressions "first", "second", or the like, used in the disclosure may indicate various components regardless of a sequence and/or importance of the components, will be used only in order to distinguish one component from the other components, and do not limit the corresponding components.

Singular forms used herein are intended to include plural forms unless explicitly indicated otherwise. It is to be understood that terms 'comprise' or 'include' used in the specification, specify the presence of features, numerals, steps, operations, components, parts mentioned in the specification or combinations thereof, but do not preclude the presence or addition of one or more other features, numerals, steps, operations, components, parts or combinations thereof.

In the disclosure, a term "user" may refer to a person using an electronic apparatus or an apparatus (for example, an artificial intelligence electronic apparatus) using an electronic apparatus.

Hereinafter, an embodiment of the disclosure will be described in detail with reference to the accompanying drawings.

FIG. 1 is a block diagram illustrating configuration of an electronic apparatus 100 according to an embodiment of the disclosure. However, this is only an example, and the electronic apparatus 100 may be implemented with some of the components in FIG. 1 being omitted.

The electronic apparatus 100 may be an apparatus that identifies an object. In addition, the electronic apparatus 100 may be an apparatus that tracks an object. Identifying an object means identifying the presence, location, etc. of an object around the electronic apparatus 100 at a certain point of time. For example, the electronic apparatus 100 may identify a person, a home appliance and the like around the electronic apparatus 100. Tracking an object means identifying the location of a specific object during a certain time period.

The electronic apparatus 100 may an apparatus which includes various sensors and identifies and tracks an object, such as a robot, a smart phone, a tablet PC, a digital camera, a smart glasses, etc. However, this is only an example, and the electronic apparatus 100 may be any apparatus capable of identifying and tracking an object.

Referring to FIG. 1, the electronic apparatus 100 includes a camera 110, a Light Detection And Ranging (LiDAR) sensor 120, a processor 130, a memory 140, and a driving unit 150.

The camera 110 is configured to photograph a still image or a moving image under the control of the processor 130. The camera 110 may photograph a still image at a certain point of time, but may photograph a still image continuously.

The camera 110 may photograph an image of an area around the electronic apparatus 100. For example, the camera 110 may photograph an image of the front of the electronic apparatus 100 at a viewing angle of 71°.

The LiDAR sensor 120 is configured to obtain scanning information on a surrounding terrain. Specifically, the LiDAR sensor 120 may obtain information on a surrounding terrain using the time it takes for a laser pulse emitted by the LiDAR sensor 120 and scattered or reflected from the surrounding terrain to return or the change in the intensity, frequency or polarization state of the scattered or reflected laser. For example, the LiDAR sensor 120 may measure the distance between the electronic apparatus 100 and the surrounding terrain on a plane 60 cm high from the ground.

The LiDAR sensor 120 may obtain scanning information on a surrounding terrain of the electronic apparatus 100 over a wide range. For example, the LiDAR sensor 120 may obtain scanning information on a surrounding terrain by scanning a 180° direction in front of the electronic apparatus 100 on a plane 60 cm high from the ground. In this case, the electronic apparatus 100 may include two LiDAR sensors 120 at the front and the rear, and obtain scanning information on a surrounding terrain by scanning a 360° direction of the front and the rear of the electronic apparatus 100 on a plane 60 cm high from the ground.

By using the scanning information obtained by the LiDAR sensor 120, it is possible to obtain information on an object around the electronic apparatus 100. For example, the scanning information may include an object in the form of column, and the electronic apparatus 100 may identify a person's leg from the distance and movement between two column-shaped objects.

Accordingly, the electronic apparatus 100 may obtain information regarding the presence of various objects, the type of the objects, the location of the objects, etc. around the electronic apparatus 100 using the LiDAR sensor 120.

In the above, it has been described that the scanning angle of the LiDAR sensor 120 is 180°, but the LiDAR sensor 120 can be implemented to scan various angles. In addition, in the above, it has been described that the LiDAR sensor 120 performs scanning on a plane, but the LiDAR sensor 120 may perform scanning three-dimensionally.

The processor 130 controls the overall operations of the electronic apparatus 100. Specifically, the processor 130 may be connected to each component of the electronic apparatus 100 and control the overall operations of the electronic apparatus 100. For example, the processor 130 may be connected to components such as the camera 110, the LiDAR sensor 120, a display (not illustrated), a communication interface (not illustrated), etc., and control the operations of the electronic apparatus 100.

The processor 130 may be implemented by a digital signal processor (DSP) processing a digital signal, a microprocessor, or a time controller (TCON). However, the processor 130 is not limited thereto, but may include one or more of a central processing unit (CPU), a micro controller unit (MCU), a micro processing unit (MPU), a controller, an application processor (AP), a graphics-processing unit (GPU) or a communication processor (CP), or an ARM processor, or may be defined by these terms. In addition, the processor 130 may be implemented by a system-on-chip (SoC) or a large scale integration (LSI) in which a processing algorithm is embedded or may be implemented in a field programmable gate array (FPGA) form. The processor 130 may perform various functions by executing computer executable instructions stored in the memory 140.

The processor 130 may track an object based on a plurality of images photographed by the camera 110 sequentially. For example, the processor 130 may identify an object from each of the plurality of images photographed by the camera 110 sequentially. In this case, the processor 130 may identify an object by applying a first intelligence model trained to identify an object to each of the plurality of images.

The processor 130 may track an object by identifying a sameness between objects identified from continuous images. In this case, the processor 130 may identify a sameness between objects identified from continuous images using a second artificial intelligence model trained to identify a sameness between objects. The processor 130 may track an object from a plurality of images which are photographed sequentially through the above-described method.

However, the disclosure is not limited thereto, and the processor 130 may identify an object or identify a sameness between objects in other ways. For example, the processor 130 may identify an object by detecting a predetermined shape from each of the plurality of images. Alternatively, the processor 130 may identify a sameness between objects based on a distance between the objects identified from continuous images.

If an object is identified in a first image from among a plurality of images and then is not identified in a second image after the first image, the processor 130 may control the camera 110 based on scanning information obtained by the LiDAR sensor 120. Here, a case where an object is not identified in the second image may include a case where the object is not identified in the image photographed by the camera 110 based on at least one of a motion of the object, a motion of the electronic apparatus 100 or a quality of the image photographed by the camera 110. For example, an object may be photographed blurrily as at least one of the object or the electronic apparatus 100 makes a sudden move or the surroundings become dark and, in this case, the processor 130 may not identify the object from the image. Alternatively, if the object is out of the photographing range of the camera 110, the processor 130 may not identify the object from the image.

The electronic apparatus 100 further includes a driving unit 150 which controls a photographing direction of the camera 110, and the processor 130 may control the driving unit 150 to change a photographing direction of the camera 110 based on scanning information. For example, if an object moves and the object is no longer identified in the image photographed by the camera 110, the processor 130 may identify the location of the object from scanning information obtained by the LiDAR sensor 120 and change a photographing direction of the camera 110 so that the object can be photographed. In this case, the processor 130 may control the driving unit 150 to change a photographing direction of the camera 110 and for example, the driving unit 150 may include at least one of a first motor which tilts the camera 110 in a vertical direction or a second motor which swivels the camera 110 in a horizontal direction. However, the driving unit 150 is not limited thereto, and the driving unit 150 may be implemented in various ways as long as it can change a photographing direction of the camera 110.

Meanwhile, the electronic apparatus 100 further includes a memory (not illustrated), and the processor 130 may identify an object based on first scanning information obtained by the LiDAR sensor 120 while the first image is obtained, match the object obtained in the first image and the object obtained in the first scanning information, and store location information of the matched object in the memory. For example, the processor 130 may identify one user from the first image and two users from the first scanning information. The processor 130 may match the one user identified from the first image with one of the two users identified from the first scanning information. For example, the processor 130 may identify that a first user around the electronic apparatus 100 is within a photographing range of the camera 110, and a second user around the electronic apparatus 100 is out of the photographing range of the camera 110. This is because the first scanning information obtained by the LiDAR sensor 120 senses a range broader than the first image photographed by the camera 110. In other words, the processor 130 may identify an object through the LiDAR sensor 120 even when the object is identified from an image, and may identify objects by distinguishing those that are being photographed by the camera 110 from among a plurality of objects identified by the LiDAR sensor from those that are not being photographed by the camera 110.

Meanwhile, such information may be stored in the memory, and the memory, although not limited thereto, may be implemented as a non-volatile memory, a volatile memory, etc. For example, a hard disk may be used in replacement for a memory, and the memory may be implemented as any component capable of storing data.

In addition, the processor 130, while the second image is obtained, may identify at least one object based on second scanning information obtained by the LiDAR sensor 120, identify an object corresponding to location information of an object stored in the memory from among the at least one object, and control the driving unit 150 to change a photographing direction of the camera 110 based on the object corresponding to the location information of the object stored in the memory.

For example, if a plurality of objects are identified based on the second scanning information, the processor 130 may identify an object most adjacent to the object stored in the memory from among the plurality of objects based on the location information of the object stored in the memory, and control the driving unit 150 to change a photographing direction of the camera 110 based on the most adjacent object.

After the photographing direction of the camera 110 is changed, when an object is identified in a third image obtained by the camera 110, the processor 130 may terminate control of the driving unit 150. In this case, the processor 130 may terminate control of the driving unit 150 when an object is identified in a predetermined area of the third image.

Meanwhile, the processor 130 may obtain location information of the matched object based on the object obtained from the first scanning information. This is because location information of the object obtained from the first scanning information may be more accurate than location information of the object identified from the first image.

If the object obtained from the first image and the object obtained from the first scanning information are matched, the processor 130 may obtain location information of the object obtained from the first image from the first image and obtain location information of the object obtained from the first scanning information from the first scanning information. For example, the processor 130 may obtain location information of the object obtained from the first image based on the photographing direction of the camera 110 and the relative location of the object in the first image, and obtain location information of the object obtained from the first scanning information based on the first scanning information.

Meanwhile, in the above, it is described that the camera 110 and the LiDAR sensor 120 are operated all the time, but this is only an example. For example, the processor 130 may obtain scanning information by turning off the LiDAR sensor 120 when an object is identified in a plurality of images which are photographed by the camera 110 sequentially and by turning on the LiDAR sensor 120 when the object is not identified in the second image. In addition, when a plurality of objects are identified from the scanning information, the processor 130 may identify one of the plurality of objects based on a photographing direction of the camera 110. For example, if a first object is identified between the front side and the right side and a second object is identified at the rear side from the scanning information, when the photographing direction of the camera is the front side, the processor 130 may identify that an object that is being photographed by the camera 110 moves to a closer location that is the location of the first object and control the driving unit 150 so that the camera 110 faces the first object.

In addition, in the above, it is described that the LiDAR sensor 120 is used, but other sensors can be used. For example, the electronic apparatus 100 may measure a distance between the electronic apparatus 100 and peripheral objects using a plurality of ultrasonic sensors instead of the LiDAR sensor 120.

Hereinafter, the operation of the processor 130 will be described in greater detail using various drawings. In the following drawings, each of the embodiments may be implemented individually or in combination.

Figure 2A:
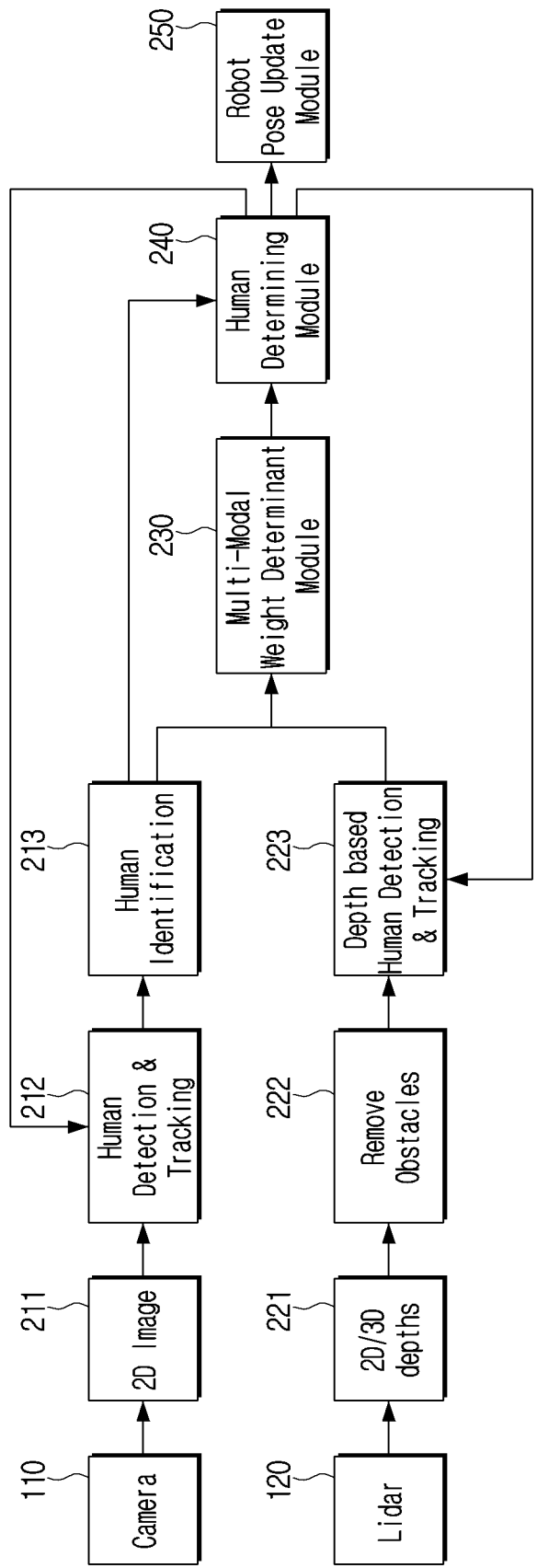
FIG. 2A is a view provided to explain an operation of a processor comprehensively according to an embodiment of the disclosure.
Figure 2B:
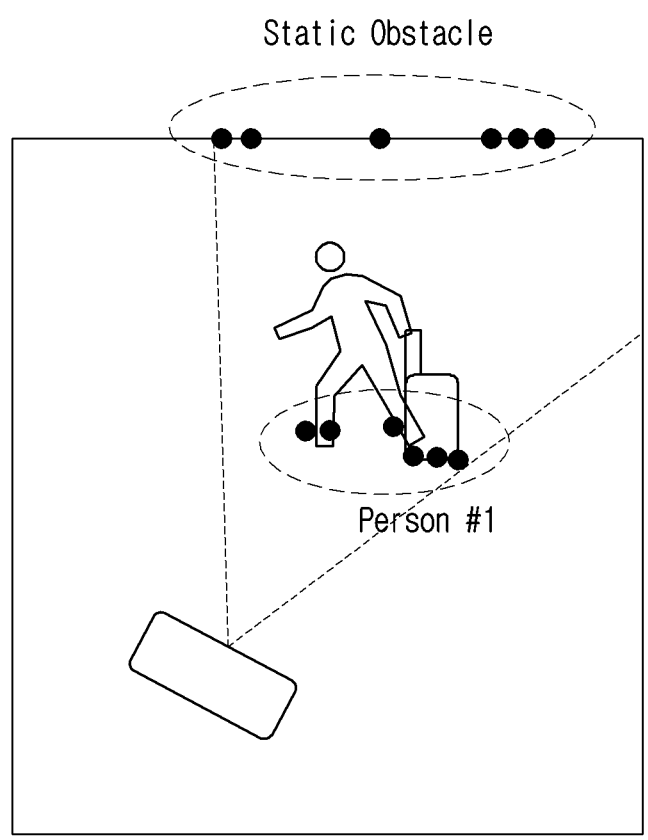
FIG. 2B is a view provided to explain an operation of a processor comprehensively according to an embodiment of the disclosure.

FIGS. 2A and 2B are views provided to explain overall operations of the processor 130 according to various embodiments of the disclosure.

Referring to FIG. 2A, the processor 130 may obtain a plurality of images 211 through the camera 110. The processor 130 may identify and track an object from the plurality of images 211 (212). For example, the processor 130 may identify a user from each of the plurality of images 211. In this case, the processor 130 may specify a user based on information stored in the electronic apparatus 100 (213). For example, the processor 130 may obtain not only information simply that a user exists but also information that the user is the owner of the electronic apparatus 100 or the owner's family from each of the plurality of images 211.

The processor 130 may obtain scanning information through the LiDAR sensor 120. Here, the scanning information is 2D or 3D depth information 221, and may include scanning information of the periphery the electronic apparatus 100 from each of a plurality of viewpoints. For convenience of explanation, 2D depth information is illustrated in FIG. 2B.

The processor 130 may remove a background from the scanning information of the periphery of the electronic apparatus from each of a plurality of viewpoints (222). For example, the processor 130 may identify an object without any change in position as an obstacle from the scanning information of the periphery of the electronic apparatus 100 from each of a plurality of viewpoints. Alternatively, the processor 130 may pre-store a Simultaneous Localization and Mapping (SLAM) map regarding obstacles and identify an obstacle based on the SLAM map. Here, the SLAM map refers to a map created regarding an environment without external assistance only with a sensor attached to a robot while the robot moves around the unknown environment.

However, the disclosure is not limited thereto, and the processor 130 may identify an obstacle in various ways. For example, the processor 130 may identify an obstacle from scanning information of the periphery of the electronic apparatus 100 through an artificial intelligence model.

In addition, the processor 130 may identify and track an object such as a user from scanning information of the periphery of the electronic apparatus 100 from each of a plurality of viewpoints (223). For example, the processor 130 may identify the shape of two legs of a user from the scanning information of the periphery of the electronic apparatus 100 from each of a plurality of viewpoints, and may identify and track the location of the user by identifying whether the movement of the shape of the two legs is similar to the walking shape of the user during a time period.

However, the disclosure is not limited thereto, and the processor 130 may identify and track a user in various ways. For example, the processor 130 may identify and track a user using a Kalman Tracking Method.

The processor 130 may assign a weight to each of the users identified by the camera 110 through a Multi-Modal Weight Determinant 230 and the users identified by the LiDAR sensor 120.

In addition, the processor 130 may identify a user through a Human Determining Module 240, and update a pose of a robot through a Robot Pose Update Module 250.

The Multi-Modal Weight Determinant 230, the Human Determining Module 240 and the Robot Pose Update Module 250 may be stored in the memory. The processor 130 may identify an object by loading modules stored in the memory sequentially. The operation of each module will be described in detail with reference to FIGS. 3 to 5.

Figure 3:
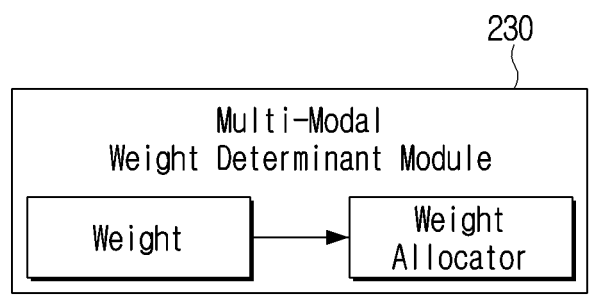
FIG. 3 is a view provided to explain an operation of modules according to an embodiment of the disclosure.
Figure 4:
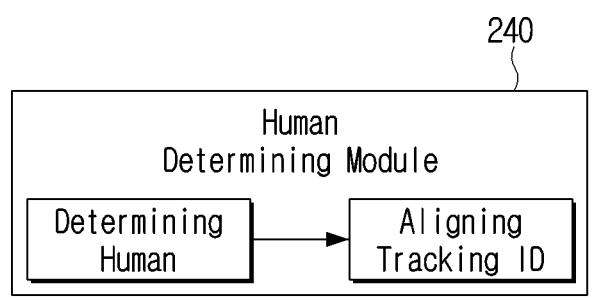
FIG. 4 is a view provided to explain an operation of modules according to an embodiment of the disclosure.
Figure 5:
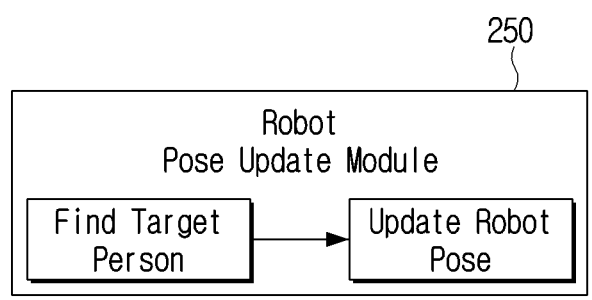
FIG. 5 is a view provided to explain an operation of modules according to an embodiment of the disclosure.

FIGS. 3, 4 and 5 are views provided to explain an operation of modules according to various embodiments of the disclosure.

Referring to FIG. 3, the processor 130 may assign a weight regarding a user identified from an image and a user identified from scanning information by executing the Multi-Modal Weight Determinant 230. In this case, the processor 130 may identify whether a user is within the photographing range of the camera 110, and assign a weight regarding a user identified from an image and a user identified from scanning information based on a result of the identification.

For example, the processor 130 may identify the presence of a user in an image not only when the user is photographed clearly by the camera 110 but also when the user is photographed blurrily. However, when the user is photographed blurrily, the processor 130 may not specify the user from the image. If it is identified that a user exists in an image but the user is not identified from the scanning information due to an obstacle, etc., the processor 130 may assign a higher weight to information regarding the user identified from the image than to information regarding the user identified from the scanning information.

Alternatively, if it is identified that a user exists in an image and the user is identified from the scanning information, the processor 130 may assign a higher weight to information regarding the user identified from the scanning information than information regarding the user identified from the image. This is because the user is not identified clearly from the image and thus, the reliability of the scanning information is higher.

Meanwhile, the processor 130 may assign a weight based on the relative speed of the electronic apparatus 100 of a user. For example, if there is no movement of the user in a plurality of images, the processor 130 may assign a higher weight to information regarding the user identified from the image than information regarding the user identified from the scanning information.

If the relative speed of the electronic apparatus 100 of the user is equal to or greater than a threshold speed, the processor 130 may assign a higher weight to information regarding the user identified from the scanning information than information regarding the user identified from the image.

Meanwhile, when even the presence of a user is not identified from the image, the processor 130 may assign a higher weight to information regarding the user identified from the scanning information than information regarding the user identified from the image. The processor 130 may change a photographing direction of the camera 110 based on the location information of the user identified from the scanning information.

Referring to FIG. 4, the processor 130 may identify and track a user by executing the Human Determining Module 240. In this case, the processor 130 may use a weight obtained by the Multi-Modal Weight Determinant 230.

The processor 130 may store information regarding an identified user in the memory 140 and subsequently, use the information to identify the user from an image photographed by the camera 110. For example, if there is no information regarding a user in the memory, the processor 130 may use an artificial intelligence model to identify a user from an image. On the other hand, if there is information regarding a user in the memory 140, the processor 130 may identify the user though the method of identifying whether there is a matching part to the user in the image. In other words, according to whether information regarding a user is stored in the memory 140, subsequently, the method of identifying a user may vary.

In addition, the processor 130 may store information regarding an identified user in the memory 140 and subsequently, use the information to identify the user from scanning information obtained by the LiDAR sensor 120. For example, if there is no information regarding a user in the memory 140, the processor 130 may identify whether the user exists in the entire area in order to identify the user from the scanning information. On the other hand, if there is information regarding a user in the memory 140, the processor 130 may identify whether the user exists in a partial area of the scanning information corresponding to the location of the user. In other words, depending on whether information regarding a user is stored in the memory 140, the range of the area for identifying the user in the future may be changed, and the operation speed may be improved.

Referring to FIG. 5, the processor 130 may change a photographing direction of the camera 110 so that the camera 110 faces an identified user by executing the Robot Pose Update Module 250.

For example, the electronic apparatus 100 may further include a driving unit 150 that controls a photographing direction of the camera 110, and control the driving unit 150 to change the photographing direction of the camera 110. Alternatively, the processor 130 may move the electronic apparatus 100 itself in order to change the photographing direction of the camera 110.

Meanwhile, in the above, it is described that if a user is not within the photographing range of the camera 110, the user is identified based on scanning information, and the photographing direction of the camera 110 is changed so as to face the identified user.

However, the disclosure is not limited thereto, and the processor 130 may change the photographing direction of the camera 110 when the user is positioned in an area of the image photographed by the camera 110. For example, if the user is located near the center of the first image photographed by the camera 110 and is located near the edge of the second image photographed by the camera 110 as the user moves, the processor 130 may change the photographing direction of the camera 110 so that the user is photographed near the center of the image again. In this case, scanning information by the LiDAR sensor 120 may be used to identify the location information of the user more accurately.

Figure 6:
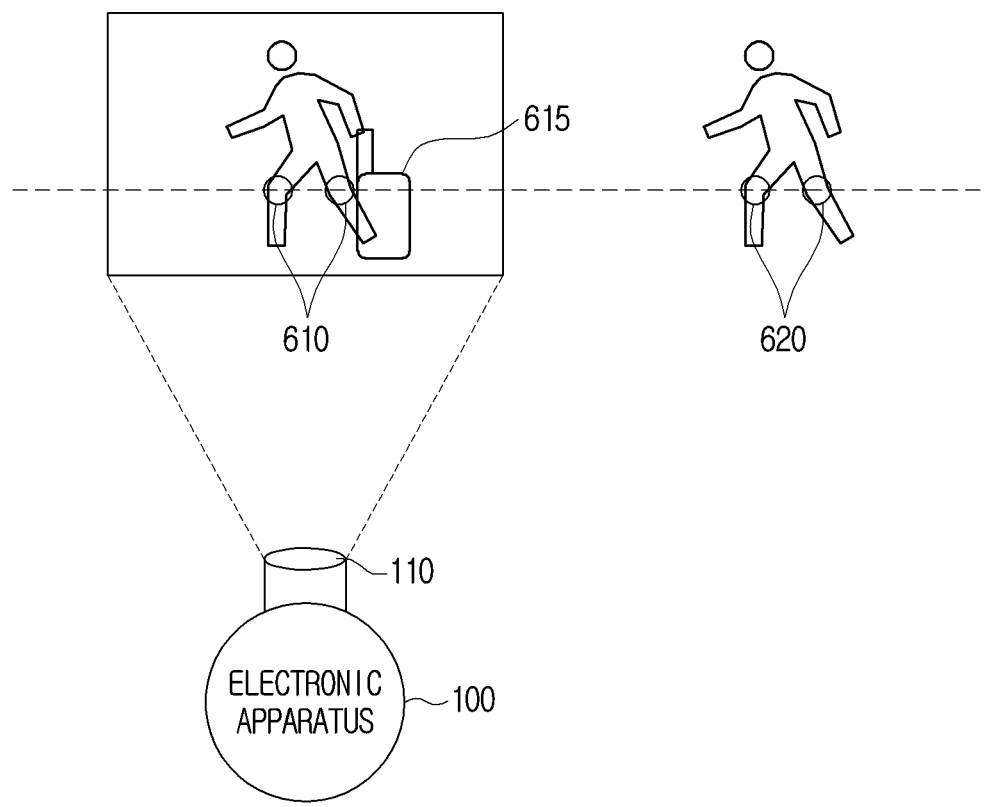
FIG. 6 is a view provided to explain a range of information obtained by a camera and a LiDAR sensor according to an embodiment of the disclosure.

FIG. 6 is a view provided to explain a range of information obtained by the camera 110 and the LiDAR sensor 120 according to an embodiment of the disclosure.

The camera 110 may photograph an image of an area around the electronic apparatus 100. For example, as illustrated in FIG. 6, the camera 110 may photograph an image including a first user on the left side in front of the electronic apparatus 100. On the other hand, the camera 110 may not photograph a second user on the right side when the first user is photographed due to the limited angle of view.

The LiDAR sensor 120 may obtain scanning information regarding a surrounding terrain of the electronic apparatus 100. For example, as illustrated in FIG. 6, the LiDAR sensor 120 may measure a distance between the electronic apparatus 100 and a surrounding terrain on a plane 60 cm high from the ground. The processor 130 may identify the user's legs, desk legs, sofa, etc. from the scanning information. In the example of FIG. 6, the processor 130 may identify the legs 610 of the first user and a wide object (a carrier) 615 on the left side and the legs 620 of the second user on the right side.

FIGS. 7A, 7B, 8A and 8B are views provided to explain a case where a user is not identified according to various embodiments of the disclosure.

Figure 7A:
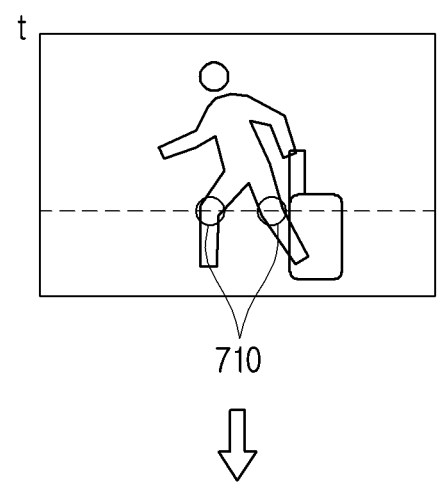
FIG. 7A is a view provided to explain a case where a user is not identified according to an embodiment of the disclosure.
Figure 7A:
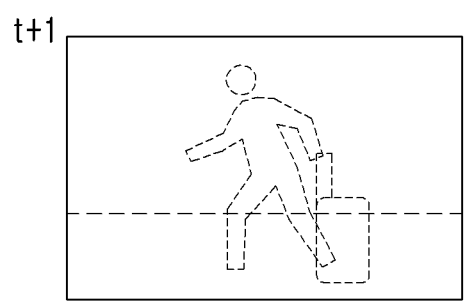

As illustrated in the upper part of FIG. 7A, the processor 130 may identify a user from an image at time point t from among a plurality of images photographed by the camera 110. In addition, the processor 130 may identify the legs 710 of the user from the scanning information obtained by the LiDAR sensor 120 while the image at time point t is photographed.

Subsequently, as illustrated in the lower part of FIG. 7A, if the user moves at time point t+1, the processor 130 cannot identify the user from the image at time point t+1 from among a plurality of images which are photographed by the camera 110 sequentially. In addition, the processor 130 may not identify information corresponding to the user's legs 710 identified at time point t from the scanning information obtained by the LiDAR sensor 120 while the image at time point t+1 is photographed. In this case, the processor 130 may identify the user's legs at a location different from the user's legs 710 identified at time point t from the scanning information at time point t+1.

Figure 8A:
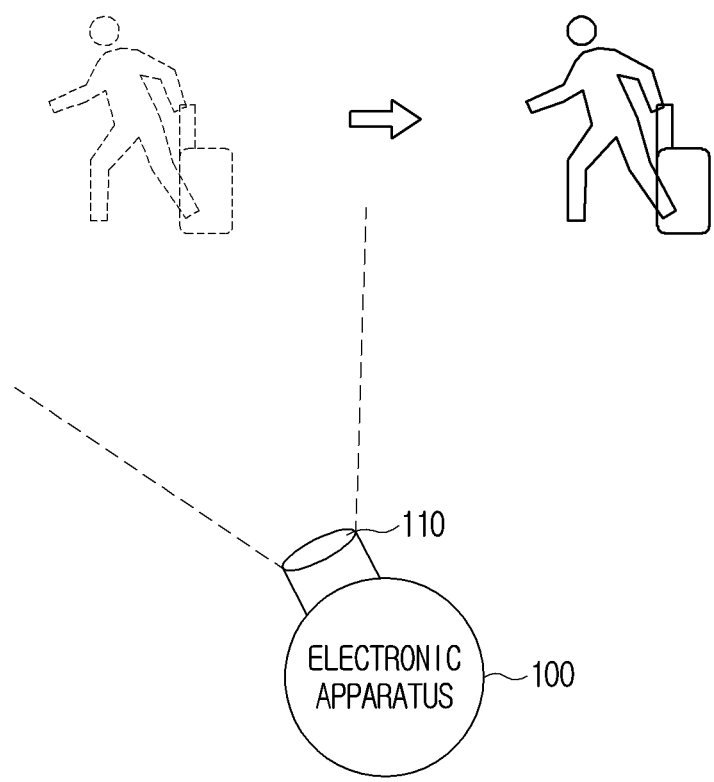
FIG. 8A is a view provided to explain a case where a user is not identified according to an embodiment of the disclosure.
Figure 8B:
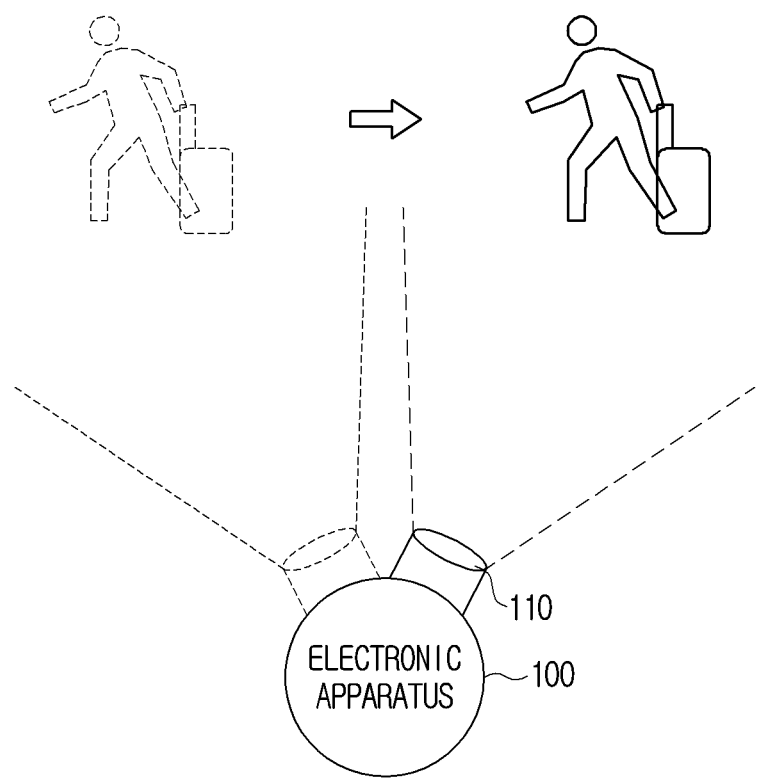
FIG. 8B is a view provided to explain a case where a user is not identified according to an embodiment of the disclosure.

For example, if the user moves to the right as illustrated in FIG. 8A, the processor 130 may not identify the user from the image photographed by the camera 110 at time point t+1, but may identify that the user is on the right side from the scanning information obtained by the LiDAR sensor 120 at time point t+1. In addition, as illustrated in FIG. 8B, the processor 130 may control to change the photographing direction of the camera 110.

Figure 7B:
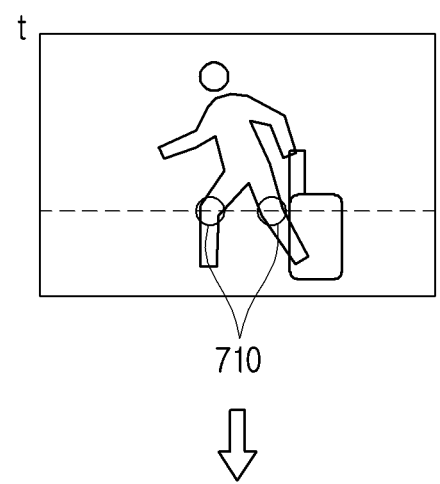
FIG. 7B is a view provided to explain a case where a user is not identified according to an embodiment of the disclosure.
Figure 7B:
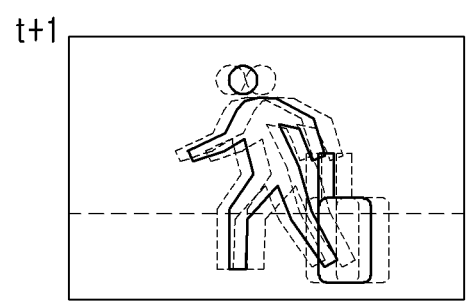

Meanwhile, as illustrated in the upper part of FIG. 7B, the processor 130 may identify the user from the image at time point t from among a plurality of images which are photographed by the camera 110 sequentially. In addition, the processor 130 may identify the user's legs 710 from the scanning information obtained by the LiDAR sensor 120 while the image at time point t is photographed.

Subsequently, as illustrated in the lower part of FIG. 7B, if the user is photographed blurrily at time point t+1, the processor 130 cannot identify the user from the image at time point t+1 from among a plurality of images which are photographed by the camera 110 sequentially. However, while the image at time point t+1 is photographed, the processor 130 may identify the user's legs from the scanning information obtained by the LiDAR sensor 120.

In addition, if the location of the user's legs identified from the scanning information at time point t+1 is within a predetermined distance from the location of the user's legs identified from the scanning information at time point t, the processor 130 may identify that the user's legs identified from the scanning information at time point t+1 is the same as the user's legs identified from the scanning information at time point t. In this case, the processor 130 may not change the photographing direction of the camera 110.

Meanwhile, if the user is not identified from the image, but the user is identified from the scanning information, the processor 130 may change the photographing setting value of the camera 110. In particular, if the user is still not identified from the image even after the photographing direction of the camera 110 is changed from the scanning information to face the identified user, the processor 130 may change the photographing setting value of the camera 110.

For example, if the user is not identified from the image, but the user is identified from the scanning information, the processor 130 may first change the photographing direction of the camera 110 from the scanning information to face the identified user. If the user is not identified from the image even after the photographing direction of the camera 110 is changed, the processor 130 may change at least one of an aperture value, an exposure value FPS or ISO of the camera 110. The processor 130 may change the photographing setting value of the camera 110 until the user is identified from the image.

Figure 9:
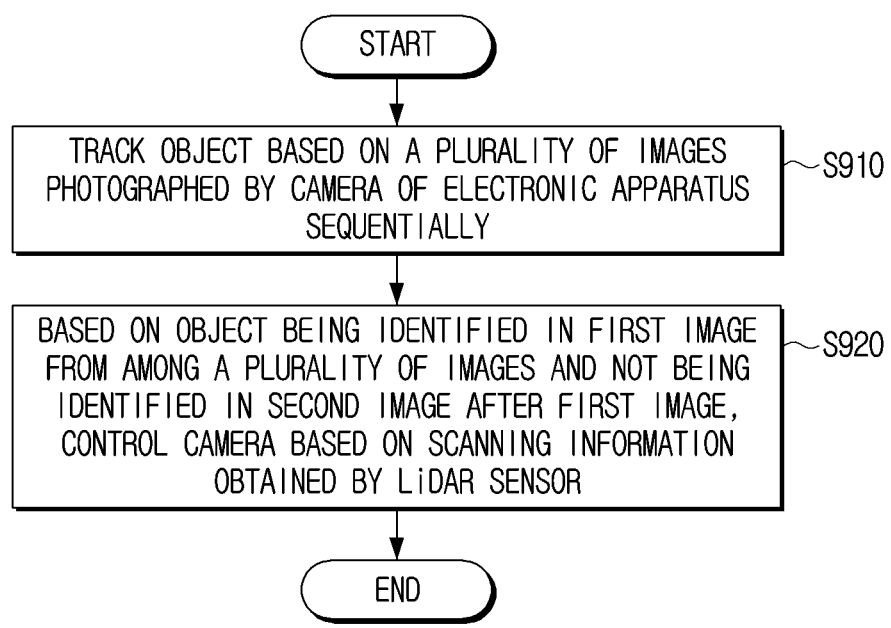
FIG. 9 is a flowchart provided to explain a method of controlling an electronic apparatus according to an embodiment of the disclosure.

FIG. 9 is a flowchart provided to explain a method of controlling an electronic apparatus according to an embodiment of the disclosure.

Firstly, an object is tracked based on a plurality of images which are photographed by a camera of an electronic apparatus sequentially (S910). If the object is identified in a first image from among the plurality of images and then, the object is not identified in a second image after the first image, a photographing direction of the camera is controlled based on scanning information obtained by a LiDAR sensor of the electronic apparatus (S920).

In addition, the step of changing the photographing direction of the camera based on the scanning information may be further included.

Here, the step of identifying the object based on first scanning information obtained by the LiDAR sensor while the first image is obtained, the step of matching the object obtained in the first image and the object obtained in the first scanning information and the step of storing location information of the matched object in a memory of the electronic apparatus may be further included.

The step of controlling the photographing direction of the camera (S920) may include the step of identifying at least one object based on second scanning information obtained by the LiDAR sensor while the second image is obtained, the step of identifying an object corresponding to the location information of the object stored in the memory and the step of changing the photographing direction of the camera based on the object corresponding to the location information of the object stored in the memory.

In addition, the step of identifying an object corresponding to the location information of the object stored in the memory may include, based on a plurality of objects being identified based on the second scanning information, identifying an object most adjacent to the object stored in the memory from among the plurality of objects, and the step of changing the photographing direction of the camera may include changing the photographing direction of the camera based on the most adjacent object.

If an object is identified in a third image obtained by the camera after the photographing direction of the camera is changed, the step of terminating control of the photographing direction of the camera may be further included.

In addition, the step of obtaining location information of the matched object based on the object obtained from the first scanning information may be further included.

Meanwhile, the step of controlling the photographing direction of the camera (S920) may include, based on the object not being identified in the second image, obtaining scanning information by turning on the LiDAR sensor and based on a plurality of objects being identified from the scanning information, identifying one of the plurality of objects based on the photographing direction of the camera.

In addition, a case where the object is not identified in the second image may include a case where the object is not identified in the image photographed by the camera based on at least one of a motion of the object, a motion of the electronic apparatus or a quality of the image photographed by the camera.

Meanwhile, the scanning information obtained by the LiDAR sensor may be information obtained by scanning a direction of 180° or 300° with reference to the electronic apparatus.

According to the above-described various embodiments, an electronic apparatus may track an object by a LiDAR sensor continuously even if the object is not identified by a camera of the electronic apparatus.

In addition, even though the location of the object is changed, the electronic apparatus may obtain the image of the object again by changing the photographing direction of the camera based on the location information of the object by the LiDAR sensor.

Further, as the electronic apparatus can identify a user in all directions without the need to user a plurality of cameras, the manufacturing cost is lowered, and the processing speed is improved since there is no need to process a plurality of images or images in all directions.

Meanwhile, according to an embodiment, the above-described various embodiments of the disclosure may be implemented as software including instructions that can be stored in machine-readable storage media, which can be read by machine (e.g., computers). The machine refers to an apparatus that calls instructions stored in a storage medium, and can operate according to the called instructions, and the apparatus may include an electronic apparatus (e.g., an electronic apparatus (A)) according to the embodiments described in the disclosure. When an instruction is executed by a processor, the processor may perform a function corresponding to the instruction by itself, or by using other components under its control. The instruction may include a code that is generated or executed by a compiler or an interpreter. The storage medium that is readable by machine may be provided in the form of a non-transitory storage medium. Here, the term 'non-transitory' only means that a storage medium does not include signals, and is tangible, but does not indicate whether data is stored in the storage medium semi-permanently or temporarily.

In addition, according to an embodiment of the disclosure, the method according to the various embodiments described above may be provided while being included in a computer program product. A computer program product refers to a product, and it can be traded between a seller and a buyer. The computer program product can be distributed on-line in the form of a storage medium that is readable by machines (e.g., a compact disc read only memory (CD-ROM)), or through an application store (e.g., Play Store™). In the case of on-line distribution, at least a portion of the computer program product may be stored in a storage medium such as the server of the manufacturer, the server of the application store, and the memory of the relay server at least temporarily, or may be generated temporarily.

In addition, according to an embodiment of the disclosure, the aforementioned various embodiments of the disclosure may be implemented in a computer or a recording medium that can be read by a device similar to a computer by using software, hardware or a combination thereof. In some cases, the embodiments described in this specification may be implemented as a processor itself. Meanwhile, according to implementation by software, the embodiments such as procedures and functions described in this specification may be implemented as separate software modules. Each of the software modules may perform one or more functions and operations described in this specification.

Meanwhile, computer instructions for performing processing operations of devices according to the aforementioned various embodiments of the disclosure may be stored in a non-transitory computer-readable medium. When computer instructions stored in such a non-transitory computer-readable medium are executed by the processor of a specific device, processing operations at devices according to the aforementioned various embodiments are made to be performed by the specific device. A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

Also, each of the components according to the aforementioned various embodiments (e.g., a module or a program) may consist of a singular object or a plurality of objects. In addition, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order, or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a camera;
a Light Detection And Ranging (LiDAR) sensor;
memory storing one or more computer programs; and
one or more processors communicatively coupled to the camera, the LiDAR sensor, and the memory,
wherein the one or more computer programs include computer-executable instructions that, when executed by the one or more processors, cause the electronic apparatus to track an object based on a plurality of images photographed by the camera sequentially and LiDAR scan information obtained by the LiDAR sensor,
wherein the LiDAR scan information comprises a corresponding location of the object,
wherein, to track the object, the one or more computer programs include computer-executable instructions that, when executed by the one or more processors, cause the electronic apparatus to:
identify the object in a first image from among the plurality of images,
determine that the object is not identified in a second image from among the plurality of images,
transition the LiDAR sensor from an off state to an on state,
obtain the LiDAR scan information from the LiDAR sensor, and
control a photographing direction of the camera based on a first location of the object from the first image and a second location of the object from the LiDAR scan information corresponding to the second image, and
wherein, to track the object, the one or more computer programs further include computer-executable instructions that, when executed by the one or more processors, cause the electronic apparatus to:
change a range of an area of the LiDAR scan information for identifying the object based on whether information regarding the object is stored in the memory.

2. The electronic apparatus as claimed in claim 1, further comprising:
a driving unit configured to control the photographing direction of the camera,
wherein, to control the photographing direction of the camera, the one or more computer programs further include computer-executable instructions that, when executed by the one or more processors, cause the electronic apparatus to control the driving unit to change the photographing direction of the camera from the first location of the object to the second location of the object.

3. The electronic apparatus as claimed in claim 2, wherein the one or more computer programs further include computer-executable instructions that, when executed by the one or more processors, cause the electronic apparatus to:

identify at least one object based on the LiDAR scan information, identify a second object corresponding to location information of a matched object stored in the memory from among the at least one object, and control the driving unit to change a photographing direction of the camera based on the second object corresponding to the location information of the matched object stored in the memory.

4. The electronic apparatus as claimed in claim 3, wherein one or more computer programs further include computer-executable instructions that, when executed by the one or more processors, cause the electronic apparatus to, based on a plurality of objects being identified based on the LiDAR scan information:

identify an object most adjacent to the matched object stored in the memory from among the plurality of objects based on the location information of the matched object stored in the memory, and control the driving unit to change a photographing direction of the camera based on the most adjacent object.

5. The electronic apparatus as claimed in claim 3, wherein the one or more computer programs further include computer-executable instructions that, when executed by the one or more processors, cause the electronic apparatus to, based on the object being identified in a third image obtained by the camera after the photographing direction of the camera is changed, terminate control of the driving unit.

6. The electronic apparatus as claimed in claim 2, wherein the one or more computer programs further include computer-executable instructions that, when executed by the one or more processors, cause the electronic apparatus to obtain location information of a matched object stored in the memory based on the identified object.

7. The electronic apparatus as claimed in claim 1, wherein the one or more computer programs further include computer-executable instructions that, when executed by the one or more processors, cause the electronic apparatus to:

based on a plurality of objects being identified from the LiDAR scan information, identify one of the plurality of objects based on a photographing direction of the camera.

8. The electronic apparatus as claimed in claim 1, wherein a case where the object is not identified in the second image includes a case where the object is not identified in an image photographed by the camera based on at least one of a motion of the object, a motion of the electronic apparatus or a quality of the image photographed by the camera.

9. The electronic apparatus as claimed in claim 1, wherein the LiDAR scan information obtained by the LiDAR sensor is information obtained by scanning a direction of 180° or 360° with reference to the electronic apparatus.

10. A method performed by an electronic apparatus, the method comprising:

tracking an object based on a plurality of images photographed by a camera of the electronic apparatus sequentially and LiDAR scan information obtained by a LiDAR sensor; and wherein the LiDAR scan information comprises a corresponding location of the object, and wherein the tracking of the object comprises:

identifying the object in a first image from among the plurality of images;

determining that the object is not identified in a second image from among the plurality of images;

transitioning the LiDAR sensor from an off state to an on state;

obtaining the LiDAR scan information from the LiDAR sensor;

changing a range of an area of the LiDAR scan information for identifying the object based on whether information regarding the object is stored in a memory of the electronic apparatus; and controlling a photographing direction of the camera based on a first location of the object from the first image and a second location from the object from the LiDAR scan information corresponding to the second image.

11. The method as claimed in claim 10, wherein the controlling of the photographing direction of the camera comprises:

identifying at least one object based on the LiDAR scan information;

identifying a second object corresponding to location information of a matched object stored in the memory of the electronic apparatus from among the at least one object; and changing a photographing direction of the camera based on the second object corresponding to the location information of the matched object stored in the memory.

12. The method as claimed in claim 11, wherein the identifying of the second object corresponding to location information of a matched object stored in the memory comprises, based on a plurality of objects being identified based on the LiDAR scan information, identifying an object most adjacent to the matched object stored in the memory from among the plurality of objects based on the location information of the matched object stored in the memory; and wherein the changing of the photographing direction of the camera comprises changing a photographing direction of the camera based on the most adjacent object.

13. The method as claimed in claim 11, further comprising:

based on the object being identified in a third image obtained by the camera after the photographing direction of the camera is changed, terminating control of the photographing direction of the camera.

14. The method as claimed in claim 10, further comprising:

obtaining location information of a matched object based on the identified object.

15. The method as claimed in claim 10, wherein the controlling of the photographing direction of the camera comprises:

based on a plurality of objects being identified from the LiDAR scan information, identifying one of the plurality of objects based on a photographing direction of the camera.

16. The electronic apparatus as claimed in claim 1, wherein the one or more computer programs further include computer-executable instructions that, when executed by the one or more processors, cause the electronic apparatus to:

identify another object in the second image, compare the object in the first image and the other object in the second image, and determine that the object in the first image is not identified in the second image after the first image based on the comparison.

17. The electronic apparatus as claimed in claim 16, wherein the one or more computer programs further include computer-executable instructions that, when executed by the one or more processors, cause the electronic apparatus to:

assign a weight to the other object based on the second image and on the LiDAR scan information, and
control the photographing direction of the camera based on the assigned weight to the other object.

* * * * *